March 11, 1941.   W. RUNGE   2,234,654
DIRECTION FINDER
Filed Feb. 15, 1935
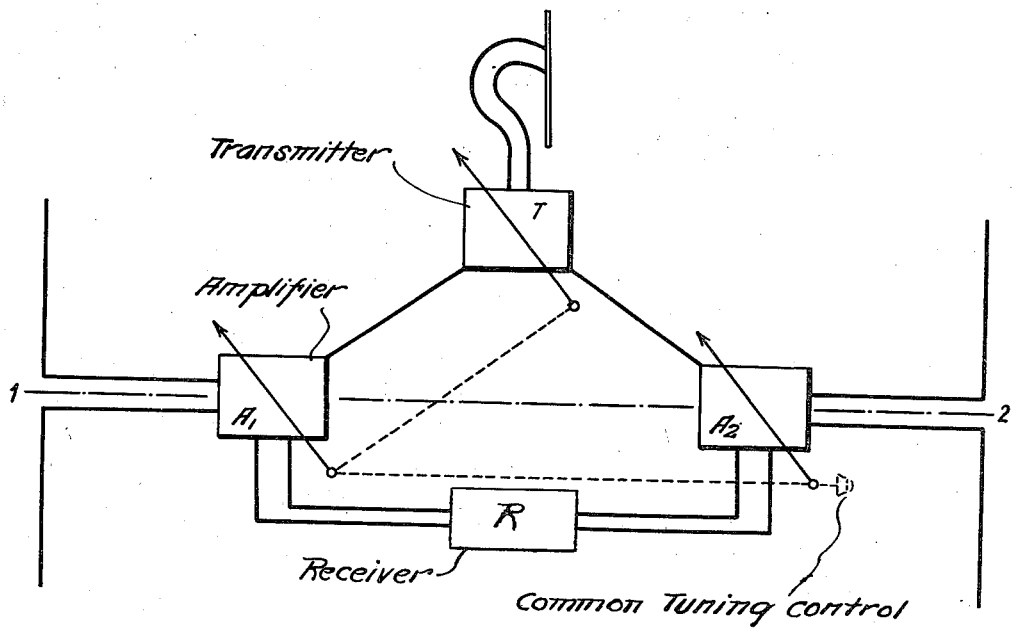
INVENTOR.
WILHELM RUNGE
BY
ATTORNEY.

Patented Mar. 11, 1941

2,234,654

UNITED STATES PATENT OFFICE 2,234,654

DIRECTION FINDER

Wilhelm Runge, Berlin, Germany, assignor to Telefunken Gesellschaft für Drahtlose Telegraphie m. b. H., Berlin, Germany, a corporation of Germany Application February 15, 1935, Serial No. 6,634
In Germany February 15, 1934

7 Claims. (Cl. 250—11)

This invention relates to an improved direction finder receiving system having freedom from night effect and having associated therewith a local control transmitter or oscillator. In taking radio direction finder bearings of distant transmitters by means of a rotatable loop or frame antenna, errors in the direction finding occur as is well known in the art if the plane of polarization of the back radiated field lies in such a way that the electrical field vector does not fall into the vertical plane going through the transmitter and the receiver. To avoid this effect and the resulting errors it has already been proposed to avoid the use of a loop or frame antenna and to provide two vertical antennas rotatable about a vertical axis therebetween, and then to apply the difference of the two receiving effects thereof to a common receiver. Such a system is known in the art as an Adcock direction finder. In place of the two vertical antennas two loop or frame antennas may likewise be used which are opposingly connected to each other. Such a receiving system always furnishes a zero point in the directional indication if the direction of the incident wave is at a right angle to the line of connection of the two antennas or frames, since in this case both parts of the frames are excited in equal phase and with signals that are of equal strength and, therefore, balance out. The method, however, has in practice the following disadvantage: For tuning the two antennas it would be necessary to provide a common control means since a difference in the phase displacements in the two antennas causes errors in the direction finding. Since in the neighborhood of the resonance point the phase depends very much upon the tuning, this method can not be practically carried out. If, however, in order to overcome this difficulty, the natural wave of the two antennas is chosen so far apart from the receiving wave that the phase is no longer essentially dependent upon small differences in the natural wave of the two antennas, the phase equality can be fully controlled, but the energy received by the antennas will then be very small. Since, after all, it is only the difference in the amplitudes received by the two antennas that is effective in the receiver, the direction finding system has a very small sensitivity. For reasons of construction it is only possible to a minor extent to compensate this lack of sensitivity by an increase in the length of the antennas and in the distance that separates them.

Moreover, in order to obtain receiving energies from a distant direction finder transmitter which reach beyond the natural noise of an electron tube by the use of relatively small antennas or frames, it is necessary especially in case of short waves, to increase the grid potential with respect to the e. m. f. received from the field, by way of transformation, and at high frequency relatively high alternating grid voltages can only be obtained by means of resonance transformation, i. e., by measures in the tuning. In attempting, however, to transform the energy received by the antennas to high voltages in first leading it across tuning means, and to apply the same then to the tubes, the aforementioned difficulties will be encountered. The phase rotation in a tuned circuit changes to an extremely high degree with small changes in the tuning apparatus. It is also difficult to construct two separate high frequency amplifiers whose amplifications would be absolutely equal in value. Such measures could hitherto not be applied.

In accordance with the invention, as shown by the accompanying drawing, an auxiliary transmitter or local oscillator is arranged between the two tuned antennas 1 and 2 in an absolutely symmetrical position thereto. The antennas 1 and 2 are each connected by way of an amplifier A1 and A2 to a receiver R. Just the moment before the taking of a direction finding bearing the auxiliary transmitter or local oscillator is accurately adjusted to the frequency of the incoming signal of the distant direction finder transmitter. Since the auxiliary transmitter in view of its symmetrical location excites both of the tuned antennas with absolutely equal intensity and absolutely equal phase, the auxiliary transmitter, after the forming of the difference of the receiving effects of both antennas, will cancel out the local oscillations of the auxiliary transmitter and the signal will no longer be noticeable in the receiver. If the amplifications or the phases are different in back of both antennas, after forming the difference, a reception of the auxiliary transmitter energy takes place in the receiver R. Each of the amplifiers A1 and A2 may be independently gain-controlled if desired. Furthermore, the phase of the signals as received on the two antennas 1 and 2 can be adjusted or reduced to a zero difference in accordance with well known methods. The common tuning control means for the two amplifiers A1 and A2 as well as for the transmitter T makes it possible for the apparatus to be rendered completely symmetrical and suited for taking direction finding bearing without having to be troubled with the night effect of distant stations. If only with tuned antennas and without additional amplifiers the direction finder operation is carried out, the above explanations as stated in connection with separate amplifiers, are true for the couplings of both tuned antennas operating on a common intermediate circuit. A complete symmetry of the circuit can always be obtained by the balancing of the amplitude (amplification-coupling) and of the phase (tuning).

I claim:

1. A direction finding receiving system having two tuned antennas receptive of energy from a distant station, said antennas being mounted for rotation about and equidistant from a common axis, an auxiliary transmitter having a radiating antenna which is coincident with said common axis, means for radiating energy from said auxiliary transmitter with like intensity toward said two tuned antennas, said energy being of the same frequency as, and combined with, the energy radiated from said distant station, and means for obtaining indications of the differences in signal strength between the energies so collected by said two tuned antennas.

2. A system in accordance with claim 1 and having a separate amplifier connected to each of said receiving antennas, at least one of said amplifiers having means for controlling the degree of amplification.

3. A system in accordance with claim 1 and having a tuning control means common to said auxiliary transmitter and to the two receiving antennas.

4. The method of obtaining directional indications from ultra-high frequency signals radiated from a distant station, which comprises collecting said signals at two zones of reception symmetrically located with respect to, and in the same vertical plane with, a local source of radiant energy having the same frequency as that of said signals, combining said signals and said radiant energy as collected at each zone, and detecting differences in the amplitude and phase of said signals with respect to said locally propagated radiant energy, thereby to nullify the indications of "night effect."

5. The method of determining the direction of an incoming wave which comprises obtaining two currents of the same frequency from two separately and non-directionally absorbed components of said wave, superposing upon each of said currents an energy component of substantially the same frequency as that of the incoming wave, the two said superposed components being equal to one another and being derived from diametrically opposed rays of energy radiation, and detecting differences in the amplitude and phase of the separately absorbed components of said wave.

6. The method of determining the direction of an incoming wave of a given frequency after equalizing the gain characteristics of two receivers whose respective non-directional antennae are rotatable about a common vertical axis, which comprises, radiating energy of substantially the same frequency as said given frequency from a point midway between said antennae, collecting separate components of said energy on the two said antennae, adjusting the circuits of said receivers so that the amplified components of said energy are balanced out, and then detecting the difference between two currents constituting the separate components of said incoming wave which are respectively collected by each said antenna and amplified by each said receiver.

7. In a direction finding system, means comprising a pair of spaced non-directional antennae rotatable about a common axis for obtaining two currents representing two separately absorbed components of an incoming wave radiated from a distant station, means for amplifying said components, a transmitter having a radiator disposed midway between the two antennae first mentioned and adapted to radiate energy of the same frequency as the wave from said distant station, said energy being collected in equal amounts by the two said antennae, said amplifying means being adjustable to deliver equal amounts of output energy in response to the reception of energy radiated by said transmitter, and means for detecting amplitude and phase differences between the two currents first mentioned which result from different orientations of said antennae.

WILHELM RUNGE.